(12) United States Patent
Ross et al.

(10) Patent No.: US 6,307,766 B1
(45) Date of Patent: Oct. 23, 2001

(54) CONTACTLESS POWER SYSTEM

(75) Inventors: Joseph Ross, Fort Salonga; Alan Feinstein, Commack; Jack Zhu, Plainview, all of NY (US)

(73) Assignee: Bayside Controls, Inc., Port Washington, NY (US)

( * ) Notice: Subject to any disclaimer, the term of this patent is extended or adjusted under 35 U.S.C. 154(b) by 0 days.

(21) Appl. No.: 09/721,016

(22) Filed: Nov. 22, 2000

(51) Int. Cl.$^7$ .................................................... H02M 1/00
(52) U.S. Cl. ............................................ 363/144; 336/118
(58) Field of Search ............................ 363/144; 336/118, 336/117, 174

(56) References Cited

U.S. PATENT DOCUMENTS 5,737,211    4/1998  Hirai et al. .
6,233,834 *  5/2001  Walsh .................................... 336/174

* cited by examiner

*Primary Examiner*—Shawn Riley
(74) *Attorney, Agent, or Firm*—Collard & Roe, P.C.

(57) ABSTRACT

A contactless power supply device having a stationary unit and a movable unit that moves linearly in relation to the stationary unit. The stationary unit comprises a primary conductor having a power supply for supplying high frequency alternating current, at least one wire extending from the power supply along the stationary unit for carrying the current, and three switches arranged in parallel, each switch alternating its closing with the other switches to create a three phase alternating current. There is a secondary conductor disposed on the movable unit and arranged coaxially with the wire. The secondary conductor comprises a toroidal core surrounding the wire, and a three phase motor connected to the core and powered via induction from the power supply to slide the movable unit relative to the stationary unit. There are three switches connected in parallel between the motor and second controller, a plurality of Hall devices arranged in the secondary conductor for sending signals to communicate the status of the power to the first and second controllers, and a device for keeping the primary conductor and secondary conductor synchronous. The switches serially open and close to transfer alternating current in three phases from the amplifier to the motor.

10 Claims, 5 Drawing Sheets

CONTACTLESS POWER SYSTEM

BACKGROUND OF THE INVENTION

1. Field of the Invention

This invention relates to a system for transferring power without direct contact through the use of high frequency electromagnetic induction. In particular, this invention relates to a contactless power supply that also transfers control information at the same time through the same mechanism that transfers the power.

2. The Prior Art

Machine slides are generally powered directly by a motor through wires that connect the stationary power supply to the motor on the moving part of the slide. Since in many applications, the slide moves back and forth hundreds of times during an operation, the wires tend to wear very easily, and require frequent replacement. In addition, the weight of the wires, especially with large slides, can add significantly to the power requirements, and increase the inertia of the moving part of the slide.

It is therefore desirable to power a slide or other mechanism without using wires between the moving and stationary parts. One way to do this is through electromagnetic induction. This method is shown in U.S. Pat. No. 5,737,211 to Hirai et al. This patent shows the operation of a moving slide having a toroid through which wires from the stationary platform are run. The current from the wires induces a current in the toroid, which powers the slide without direct contact between the wires and the slide itself. While this device is useful for some purposes, it does not provide a way for controlling the power over the same lines.

SUMMARY OF THE INVENTION

It is therefore an object of the invention to provide a contactless power supply that also supplies control signals over the same lines as the power.

This and other objects of the invention are accomplished by a power supply comprising a stationary unit and a movable unit that moves linearly in relation to the stationary unit, a primary conductor disposed on the stationary unit and a secondary conductor disposed on the movable unit. The primary conductor comprises a power supply having an amplifier for supplying high frequency alternating current. There are a plurality of wires extending from the power supply along the stationary unit for carrying the current, and three switches arranged on the wires in parallel with each other. Each switch alternates closing with the other switches to create a three phase alternating current for powering the secondary conductor. There is also a controller connected to the power supply for controlling the operation of the power supply.

The secondary conductor is arranged coaxially with the wires and comprises a toroidal core surrounding the wires, and a three phase motor connected to the core and powered via induction from the power supply, to slide the movable unit relative to the stationary unit. Thus, no wires are needed to connect the primary to the secondary conductor. There is a second controller connected to the motor for controlling the operation of the motor, and three switches connected in parallel between the motor and second controller for conducting the current in a three-phase circuit.

A current is generated in the wires of the primary conductor, which induces a current in the secondary conductor to power the motor and move the movable unit in relation to the stationary unit. To control the operation of the power supply device, there is a Hall sensor arranged in the secondary conductor for sending signals to communicate the status of the power to the first and second controllers. There is also a device to synchronize the primary conductor and secondary conductors. The switches on the primary and secondary conductors serially open and close to transfer three-phase alternating current from the amplifier to the motor. This insures a smooth power transfer. The device according to the invention also allows control signals to travel over the same wires as the current supplying the power.

The device for synchronizing the primary and secondary conductors comprises a sync pulse generator connected in parallel with the switches on the primary conductor. The sync pulse generator sends a sync pulse to the secondary conductor at predetermined intervals.

There is a Hall sensor signal coder connected to the secondary conductor, and a Hall sensor signal decoder connected to the primary conductor. The decoder decodes signals encoded by the coder to transfer information between the first and second controllers. The coder and decoder are needed because the Hall sensor sends out signals in DC of from 0–5V, which cannot be transferred between the primary and secondary. Thus, the signals must be coded into an AC signal by the coder. The Hall device sends three different signals, each signal corresponding to a phase of the motor.

The amplifier preferably emits a 16 mHz signal. The signal from the amplifier is divided using time division modulation, with one system period being 52 $\mu$s. There are preferably 11 periods comprising S0 to S7, and SA–SC within each system period. S0 to S7 are 2 $\mu$s each with a 2 $\mu$s interval between S1 and S2, and a 1 $\mu$s interval between S4 and S5 and S5 and S6. S1 and S2 are used for transmission of signals from the sync pulse generator, S3 to S7 are used for transmitting signals from the Hall devices, and SA–SC are used for controlling time division modulation of the 3 phase motor.

SA, SB and SC are each 10 $\mu$s and correspond to a phase of the motor. There is a 1 $\mu$s interval between SA and SB, and SB and SC. The interval between the different periods prevents signal overlap due to propagation delay of optocouplers in the primary and secondary conductors.

The sync pulse generator outputs sync signals S1 and S2 to provide a positive pulse and a negative pulse, An optocoupler in the secondary conductor applies the pulses to the second controller as a synchronization signal.

Each switch is preferably a solid bidirectional switch or a semiconductor switch. The motor is preferably a linear motor.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
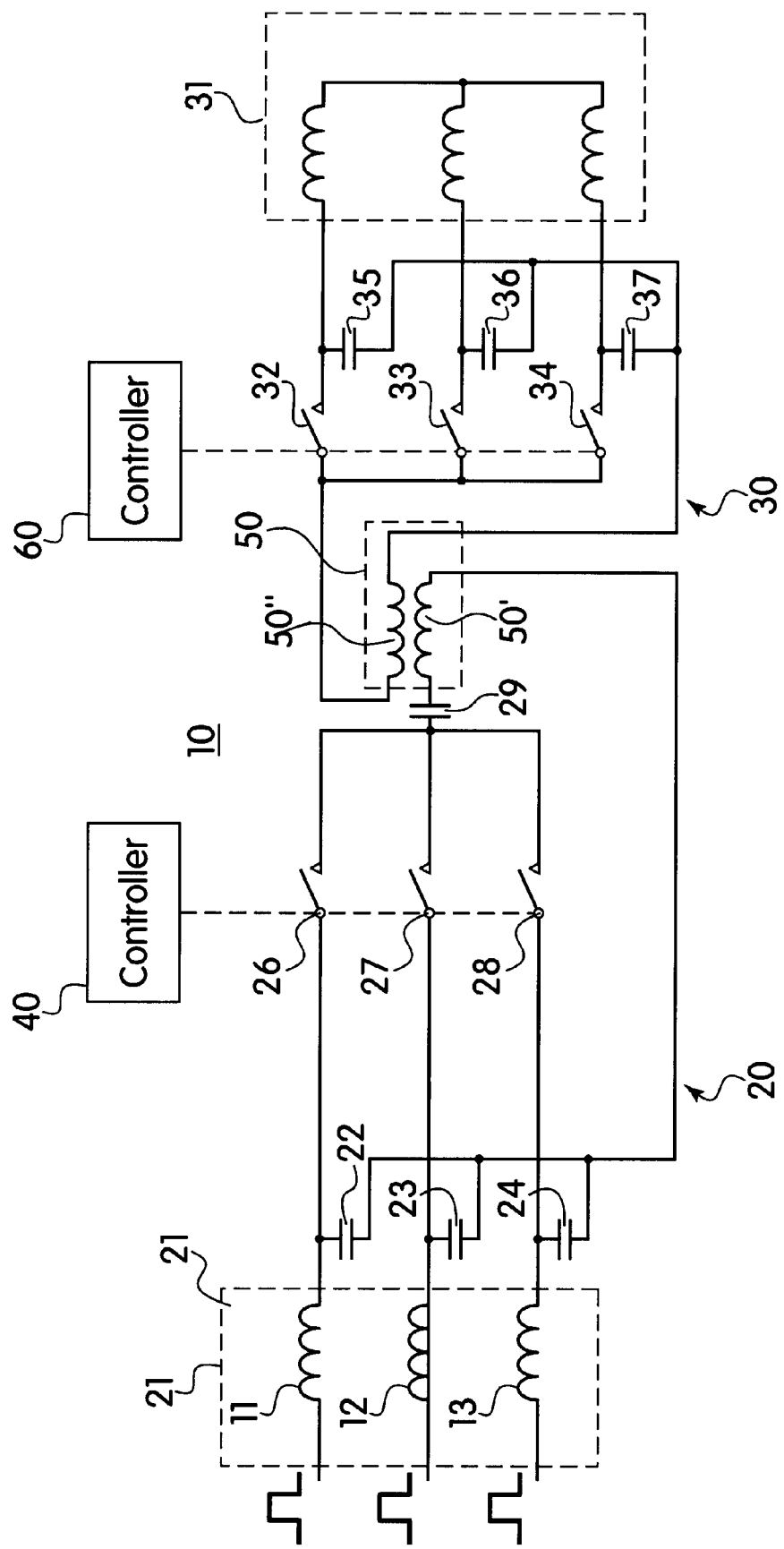
FIG. 1 shows an abbreviated schematic diagram of the power supply device according to the invention.

Referring now in detail to the drawings, FIG. 1 shows a schematic view of the contactless power system 10 according to the invention. System 10 comprises a primary conductor 20 and a secondary conductor 30. Secondary conductor 30 is powered via induction from primary conductor 20. Primary conductor 20 comprises a power supply in the form of an amplifier 21 connected in parallel with three capacitors 22, 23, 24, which are all connected to a common terminal 25. Three switches 26, 27, 28 are connected in parallel with amplifier 21 as well. Switches 26, 27 and 28 are selectively closed and opened by a controller 40. Another capacitor 29 is connected at the output of switches 26–28, and in series with primary transformer winding 50, which serves to transfer power from amplifier 21 to secondary conductor 30.

Secondary conductor 30 comprises three switches, 32, 33, 34 which are connected in parallel with a three-phase motor 31 on one side, and secondary transforming winding 50" at their input. Three capacitors 35, 36, 37, are also connected in parallel with motor 31, and to a common terminal 38. Switches 32–34 are selectively closed and opened by a controller 60.

In use, controller 40 closes and opens switches 22–24 serially to create pulses of power from amplifier 21. These pulses travel through transformer primary winding 50' to motor 31, via switches 32, 33, 34, which are closed and opened by controller 60 according to the pulses from amplifier 21. Thus, power is transferred to motor 31 inductively, and without the need of wires to connect amplifier 21 and motor 31.

Figure 2:
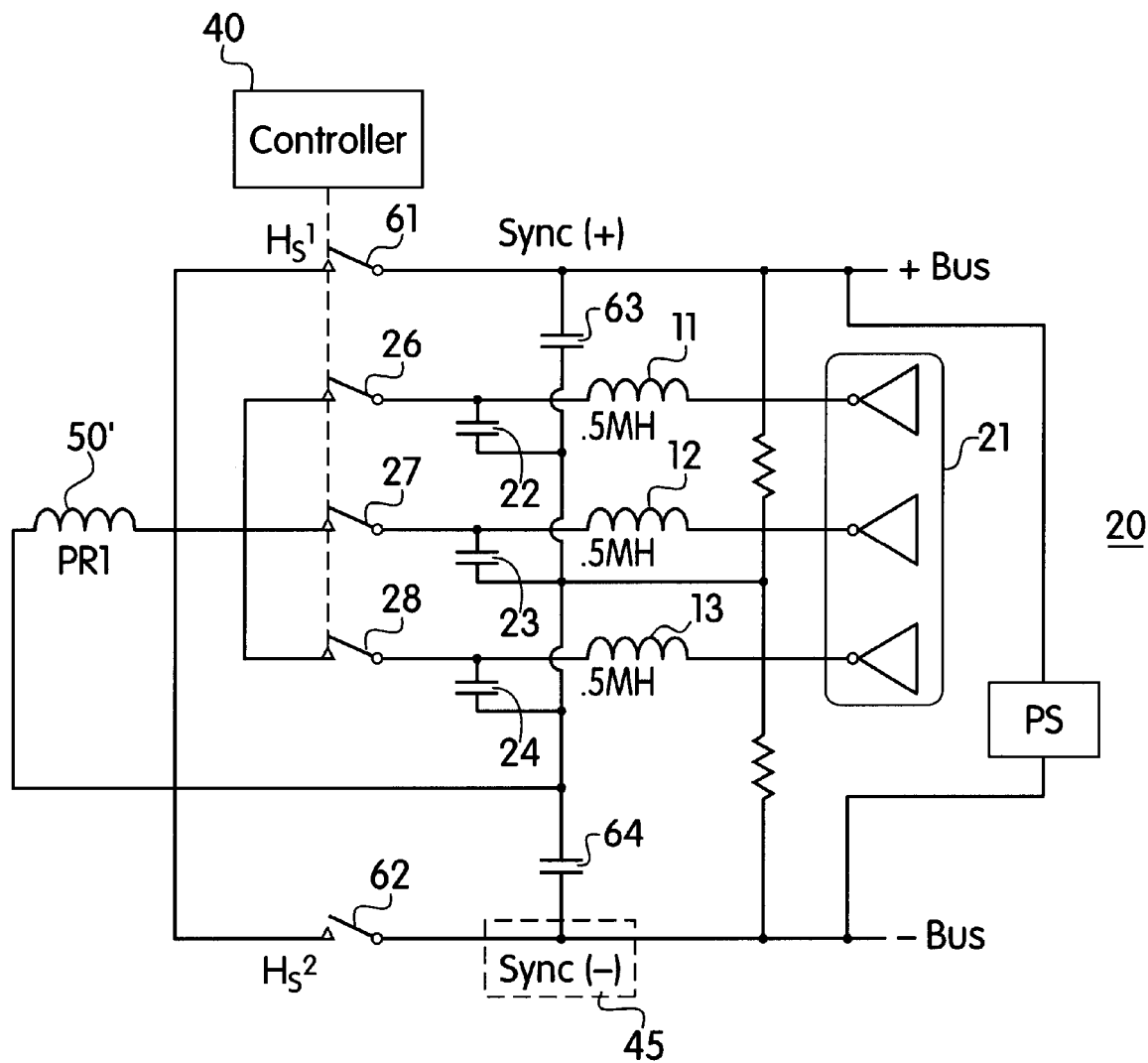
FIG. 2 shows a more detailed schematic diagram of the primary conductor of the device according to the invention.
Figure 3:
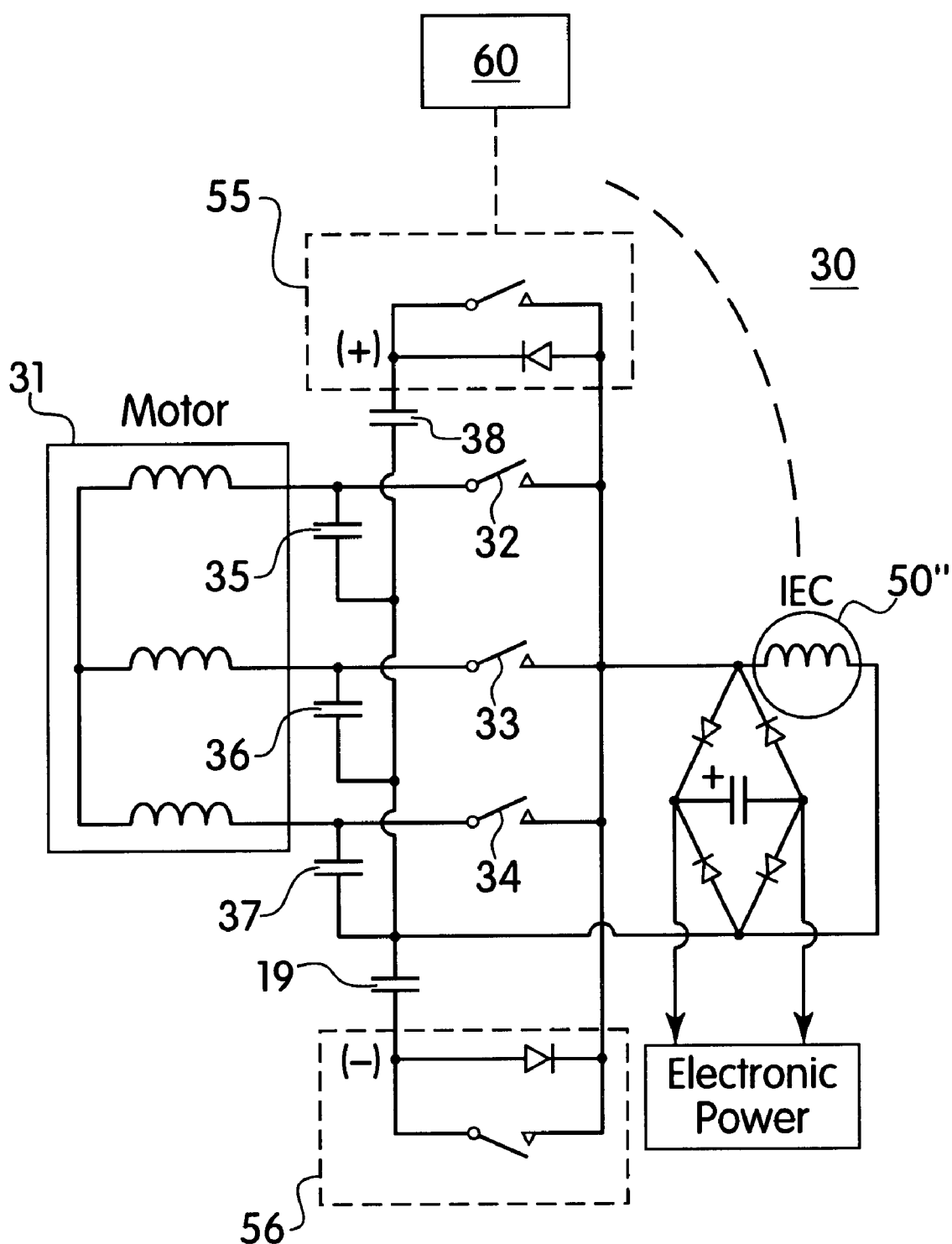
FIG. 3 shows a detailed schematic diagram of the secondary conductor of the device according to the invention.

The invention also provides for control signals to be transferred between primary conductor 20 and secondary conductor 30. A more detailed schematic diagram of primary conductor 20 is shown in FIG. 2 and a detailed schematic diagram of secondary conductor 30 is shown in FIG. 3. Switches 26–28 and 32–34 are semiconductor switches (MOSFETS) or can be IGBT's that are controlled by controllers 40 and 60, respectively. Controllers 40 and 60 are microprocessors that can store, send and retrieve information to control the operation of system 10. Connected in parallel with switches 26–28 are two satellite switches, 61 and 62, connected to capacitors 63 and 64, respectively. Satellite switches 61 and 62 connect to a tap in primary winding 50' and thus step-up the voltage in transforming secondary winding 50". This results in the separation of this control signal from the three power paths, in both voltage amplitude and time separation.

As shown in FIG. 3, secondary conductor 30 has Hall switches 55 and 56 connected in parallel with switches 32–34. Switches 55 and 56 transmit encoded Hall signals (which are in the form of 0–5 V pulse signals) that are processed into bi-polar signals by controller 60 back through transformer secondary 50" to primary winding 50', where they are decoded into normal Hall signals by controller 40 for use by amplifier 21, in order to regulate the commutation of amplifier output power.

A sync pulse generator 45, as shown in FIG. 2, is connected to primary conductor 20. Sync pulse generator 45 sends out pulses at the start of each period of power transmission to synchronize the signals between primary conductor 20 and secondary conductor 30.

Figure 4:
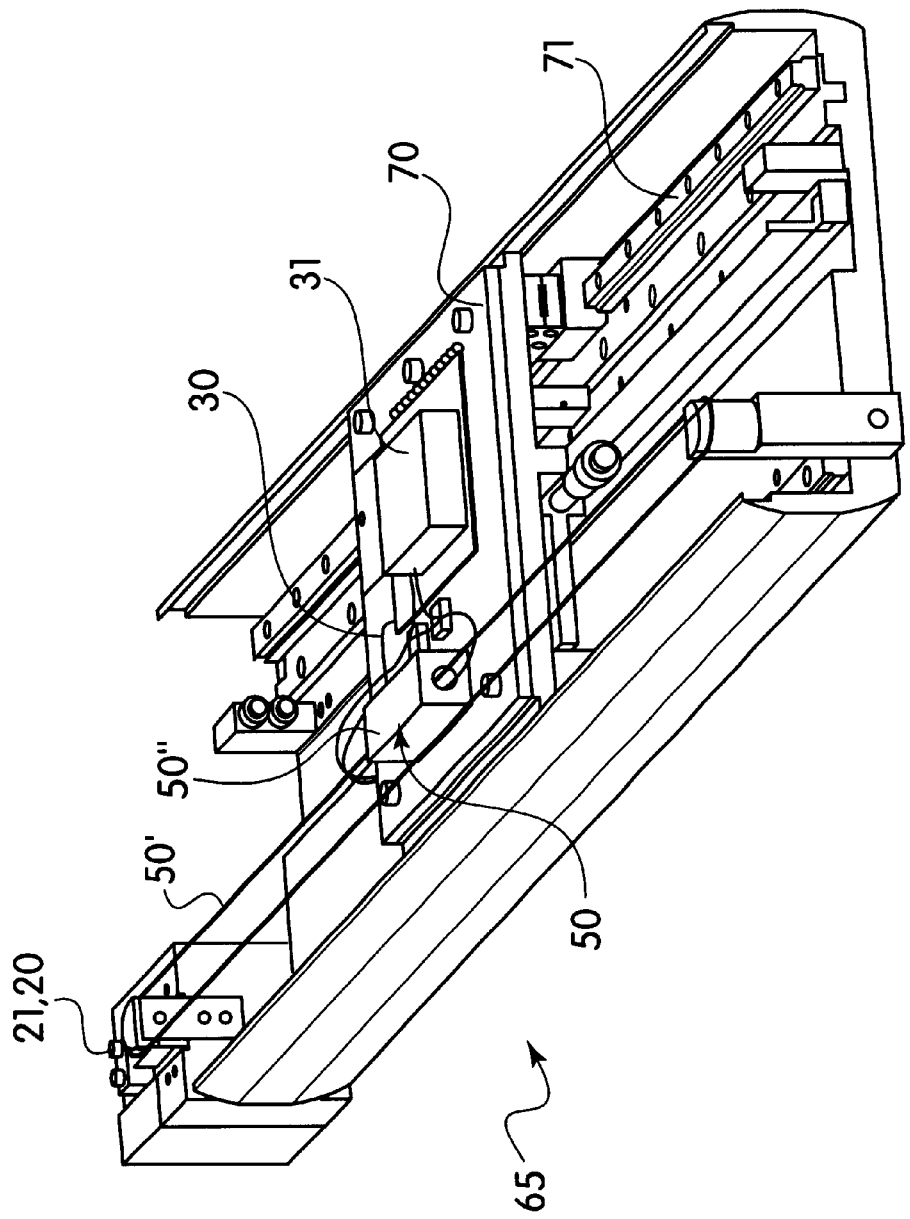
FIG. 4 shows a machine slide using the power supply device according to the invention.

FIG. 4 shows the system according to the invention in practical use on a machine slide 65. A transformer consists of a core 51, a primary coil 50' and a secondary coil 50". The core 51 and the secondary coil 50" are fixed to the carriage 70. The primary coil 50' is stationary and passes through the center of core 51. Core 51 and secondary coil 50" are free to slide along primary coil 50'. Coil 50' is connected to amplifier 21 via conductor 20 and coil 50" is connected to motor carriage 70 via electronics via conductor 30. As power is transformed from primary conductor 20 to secondary conductor 30, carriage 70 is caused to slide along rails 71 and along coil 50'.

Figure 5:
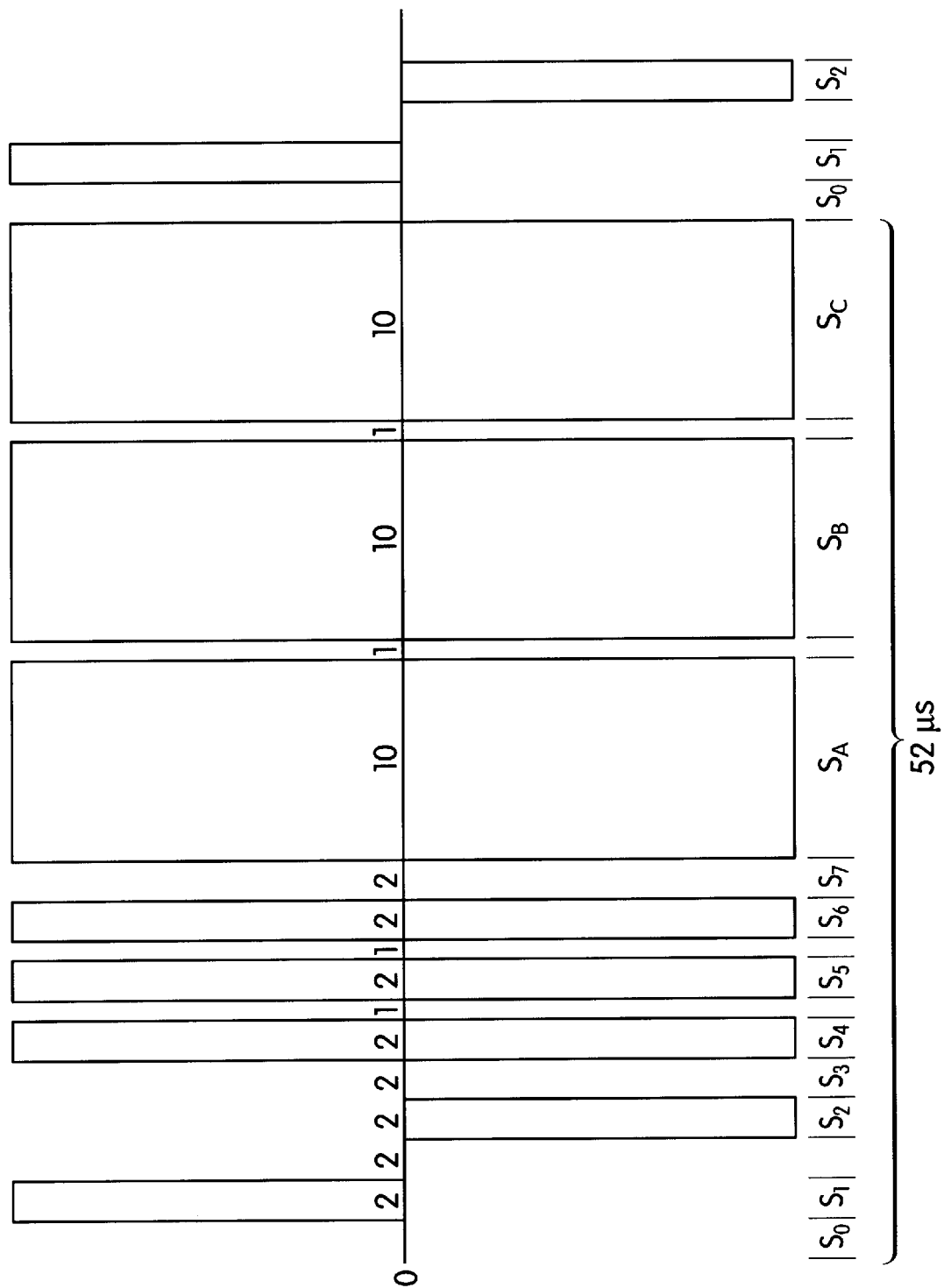
FIG. 5 shows a phase diagram of the power and control signal transmission in the system according to the invention.

FIG. 5 is a phase diagram of the power, sync pulse, and Hall signal transmission of the system according to the invention. Both primary conductor 20 and secondary conductor 30 use a 16 MHz signal as a system clock signal. Each complete system period is 52 μs long, and is divided into 8 different pulse sections as shown in FIG. 5. Each period of S0 to S7 is 2 μs in width, and each period of SA to SC is 10 μs. Between S1 and S2, there is a 2 μs interval. Between S4 and S5, S5 and S6, SA and SB and SB and SC there are 1 μs intervals. These intervals prevent signal overlap due to any propagation delay of optocouplers in the system.

S0 is the starting point of the system period. S1 and S2 are sync signals for synchronization of the primary and secondary conductors. Synch signals S1 and S2 are output signals of synch pulse generator 45 shown in FIG. 2 These signals control switches 61 and 62 to provide a positive and negative pulse, whose peak voltage equals the power bus voltage and keeps the DC component of the sync pulse at zero. The sync pulse is inputed to transformer 50, and is thus transfered to secondary conductor 30. In secondary conductor 30, switches 55 and 56 filter out the sync pulse by a level detection method, and apply it to controller 60 to synchronize the transfer of power from primary conductor 20 to secondary conductor 30.

Signals S3 to S7 are control signals generated by switches 55 and 56. SA, SB and SC are control signals for sequential transmission of the three phase motor power through transformer 50. These signals control switches 26–28 and 32–34 synchronically and respectively, creating a 3-phase power sample and hold operation.

Thus power system 10 provides for the transfer of both power and control signals over the same lines, and eliminates the need for wires connecting the primary and secondary conductors.

Accordingly, while only a single embodiment of the present invention has been shown and described, it is obvious that many changes and modifications may be made thereunto without departing from the spirit and scope of the invention.

What is claimed is:

1. A contactless power supply device having a stationary unit and a movable unit that moves linearly in relation to the stationary unit, comprising:
   a primary conductor disposed on the stationary unit and comprising:
   (a) a power supply comprising an amplifier for supplying high frequency alternating current;
   (b) a plurality of wires extending from the power supply along the stationary unit for carrying said current;
   (c) three switches arranged on said wires in parallel with each other, each switch alternating closing with said other switches to create a three phase alternating current;

(d) a first controller connected to said power supply for controlling the operation of the power supply;

a secondary conductor disposed on the movable unit and arranged for movement coaxially with said wires, said secondary conductor comprising:

(a) a toroidal core surrounding said wires;

(b) a three phase motor connected to said core and powered via induction from said power supply to slide the movable unit relative to the stationary unit;

(c) a second controller connected to said motor for controlling the operation of said motor;

(d) three switches connected in parallel between said motor and said second controller;

(e) a Hall sensor arranged on said secondary conductor for sending signals to communicate with said first and second controllers; and a device for keeping the primary conductor and secondary conductor synchronous;

wherein said switches serially open and close to transfer alternating current in three phases from said amplifier to said motor.

2. The device according to claim 1, wherein the amplifier emits a 16 mHz signal.

3. The device according to claim 1, wherein the motor is a linear motor.

4. The device according to claim 2, wherein the device for synchronizing the primary and secondary conductors comprises a sync pulse generator connected in parallel with the switches on the primary conductor, said synch pulse generator sending a synch pulse to the secondary conductor at predetermined intervals.

5. The device according to claim 1, wherein the Hall sensor sends three different signals, each signal corresponding to a phase of the motor.

6. The device according to claim 5, wherein the Hall device sends pulses of between 0–5 V DC.

7. The device according to claim 4, wherein said amplifier sends out a signal that is divided using time division modulation with one system period being 52 $\mu$s, and wherein there are 11 different periods within each system period, S0 to S7 being 2 $\mu$s each with a 2 $\mu$s interval between S1 and S2, and a 1 $\mu$s interval between S4 and S5, and S5 and S6, wherein S1 and S2 are used for transmission of signals from said synch pulse generator, S3 to S7 are used for transmitting signals from said Hall sensor and SA, SB and SC are 10 $\mu$s each and are used for controlling time division modulation of said 3 phase motor, wherein there is a 1 $\mu$s interval between SA and SB, and SB and SC, and wherein each of SA, SB and SC correspond to a phase of said motor.

8. The device according to claim 7, wherein said sync pulse generator outputs sync signals S1 and S2 to provide a positive pulse and a negative pulse that are applied to said second controller as a synchronization signal.

9. The device according to claim 1, wherein each switch is selected from the group consisting of a semiconductor switch and a solid bidirectional switch.

10. The device according to claim 1, wherein the stationary unit comprises a base and the movable unit comprises a carriage slidably mounted on rails on said base.

* * * * *